United States Patent Office 3,076,404
Patented Feb. 5, 1963

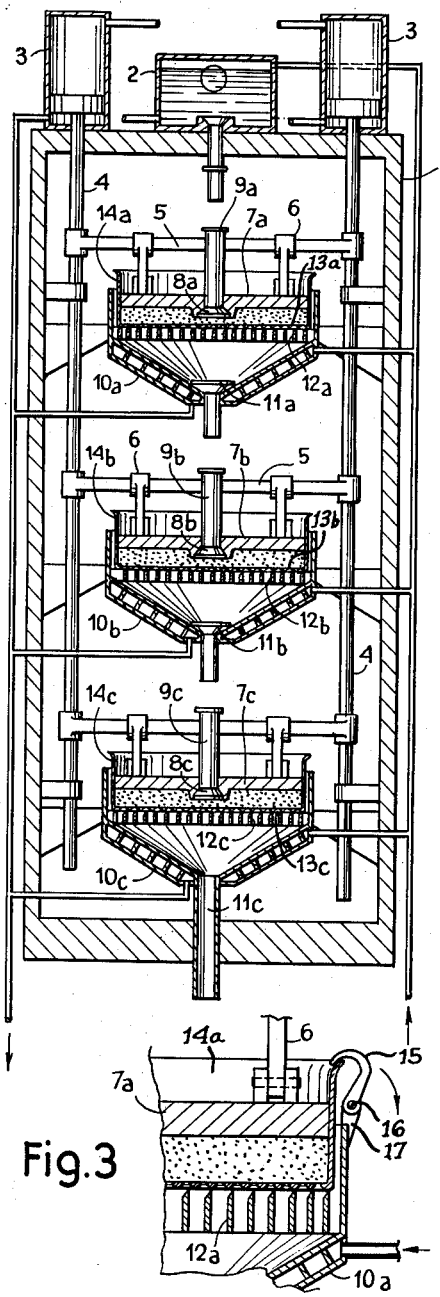
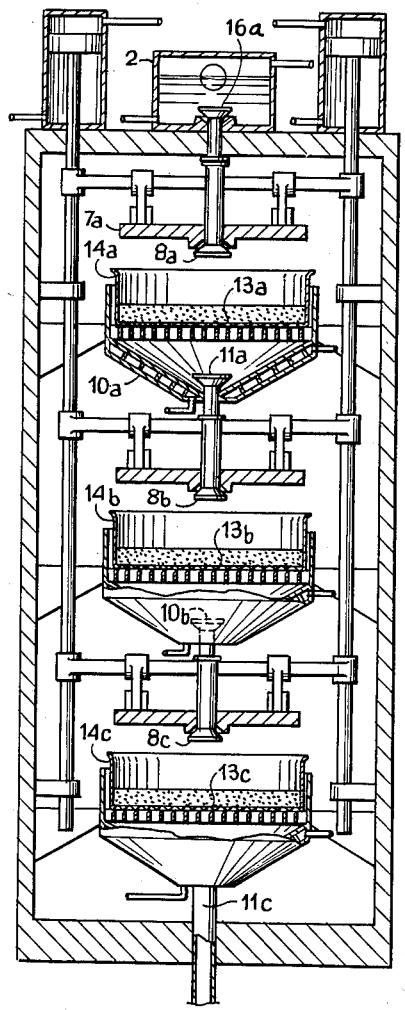
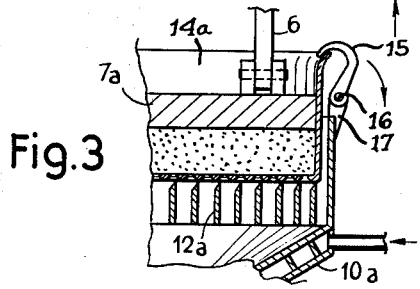
Fig. 1
Fig. 2
Fig. 3
INVENTOR:
FRANCESCO MANARESI

3,076,404
EQUIPMENT FOR THE PREPARATION OF CONCENTRATED COFFEE SOLUTIONS OR THE LIKE, ADVANTAGEOUSLY FOR THE PREPARATION OF PRODUCTS TO BE CONCENTRATED
Francesco Manaresi, Via delle Porte Nuove 12, Florence, Italy
Filed Sept. 28, 1960, Ser. No. 59,064
Claims priority, application Italy Apr. 23, 1960
4 Claims. (Cl. 99—287)

The invention relates to an equipment which is designed to obtain a concentrated solution by means of successive passages through a powder, such as coffee powder and the like, with the purpose of obtaining a particularly concentrated solution, and especially designed to the preparation of concentrated products by a process wherein a solution, concentrated and solidified by cooling, is then treated under vacuum and by heating in such manner that the solvent directly evaporates without passing into a liquid state, whereby from the frozen solution one obtains a solute powder in the form of grindable crusts. The process referred to is widely used in certain foodstuff industries and in many of the pharmaceutical industries. The equipment, according to the invention, allows a rapid working for a plurality of passages of a liquid through the enriching powder, which may be gradually utilized in the initial stages, then to be completely exhausted.

The equipment, according to the invention, operating as a hydraulic press, is substantially formed by a plurality of hopper seats, provided with grids, and an equal number of removable and replaceable filter cups or filter baskets; said hoppers being provided with drain valve means and being heated, especially by means of a water-bath. An equal number of pistons is provided to cooperate with said filter cups mounted on the grid seats, and said pistons are connected to one another and to a movable hydraulic press equipment or the like; each of the pistons being provided with a valve system, which is combined with means for receiving the liquid which is discharged from the hopper overlying the first upper piston, receiving such liquid from a loading tank.

In the embodiment, it is provided that each hopper forms a solution tank under the filter grid and a cup capable of containing the liquid pressed at each loading and means are provided to allow the discharge of the liquid from a hopper into an intake conduit combined with the subsequent hopper piston. The heated hoppers maintain the solution sufficiently warm to be enriched in the different passages.

The movable part of the press is capable of moving the pistons to a sufficiently high position so as to remove the filter cups, thus allowing the replacement. The filter cups are inter-changeable so as to allow to pass a partly exhausted filter in the stages overlying the initial formation of the mixture.

Although the opening and closing of the several valves may be effected by hand, it is to be understood that the opening may be automatic, when the lifting of the pistons has taken place, after the pistons have reached a position allowing the replacement of the filter cups and through at least an additional stroke of the movable press equipment.

The invention will be better understood following the description and the accompanying drawing, which illustrates an embodiment of said invention.

In the drawing:

FIG. 1 illustrates a longitudinal and vertical section of the press in the completed pressing arrangement;

FIG. 2 illustrates a section similar to FIG. 1 in the press arrangement prior to the start of the pressing stage;

FIG. 3 illustrates an enlarged detail.

According to what is diagrammatically illustrated in the accompanying drawing, 1 denotes a main frame, which supports atop thereof a loading tank 2 wherein a liquid is maintained at a constant level by means, for example, of an overflow pipe, as indicated in FIG. 1, and a pair of cylinder-piston systems 3, which actuate the movement of the movable unit, involving the stems 4 of the pistons of the cylinder-piston systems 3, and cross-beams 5, to which an equal number of pressing pistons, respectively indicated by 7a, 7b, 7c, are connected. Each of the pressing pistons is combined with a valve 8a, 8b, 8c, respectively, opening downwardly and associated with vertical conduits 9a, 9b, 9c, respectively. The structure 1 also supports a corresponding series of hoppers 10a, 10b, 10c, respectively, which present respectively end valves 11a, 11b, and a drain pipe at the lower end of the hopper 10c. Each hopper 10 is heated by means of a water-bath in a conventional water jacket. On each hopper 10 there is arranged a corresponding grid or mesh 12a, 12b and 12c, respectively, which serves to support a filtering wall 13 of an associated cup 14a, 14b and 14c, respectively, the units 13a, 14a, 13b, 14b, and 13a, 14c being interchangeable; said units also form the cylindrical walls which serve to cooperate as a seal (with rubber or the like, not shown) with the pistons respectively 7a, 7b, 7c, in such a manner that liquid discharged above the powder, which may be contained in the filter cup units 13, 14, is expelled by the associated piston 7 through the filtering wall 13. The cups 14a, 14b and 14c are held in position by means of hooks 15 pivoted as at 16 to arms 17 extending upwardly from the upper edge portions of the hoppers 10a, 10b and 10c, respectively, as shown in FIGURE 3.

In the initial stage, prior to the pressing stage (see FIG. 2) the powders, which are more exhausted, are contained in the filter 13a, 14a, while an only partly exhausted powder is contained in the unit 14b, 13b; the virgin powder being on the other hand contained in the unit 14c, 13c. The liquid which has passed in the previous stage through the filter located in the position 13b—14b is discharged into the unit 13c—14c; the liquid which has passed through the filter formed by the unit 13a, 14a has passed through the filter 13b, while the liquid contained in the tank 2 is passed through the filter 13a, 14a. At this point, therefore, there is water—or other liquid—in the filter 13a, 14a a solution already partly formed in the filter 13b, 14b and a solution already sufficiently concentrated on the filter 13c, 14c. Now the valves 8 are manually closed, and the movable press equipment is lowered, whereby the water, or another liquid, passes through the semi-exhausted powder, completely exhausting it, and is collected in the hopper 10a, which has the valve 11a closed; the same occurs for the already formed solution, which from the filter 13b, 14b, through the powder therein contained, is collected in the hopper 10b; the already sufficiently concentrated solution contained in the filter 14c, 13c is passed through the virgin powder and is discharged from the conduit 11c. The arrangement at the end of the pressing stage is that illustrated in FIG. 1.

When this operation has been completed, the pistons 7 are brought upwards again and the cup 14a, 13a is replaced by the cup previously located in the position 13b, 14b and the cup 14c, 13c is brought into the position previously assumed by the one denoted by 14b, 13b.

A cup containing the new powder, for instance the same cup 14a, 13a, which has contained the exhausted and removed powder, is inserted into the position previously assumed by the cup 14c, 13c; in this way, the previous situation is re-established in relation to the more or less exhausted powders. Then the valves 8c, 11b are opened to discharge the solution of the hopper 10b into the filter which has assumed the position 14c, 13c. The valves 8c and 11b are then closed and the valves 8b, 11a are opened to allow the discharge of the hopper 10a into the filter which is located in the position 14b, 13b while the valve 8a is opened together with a valve 16a of the tank 2 to discharge the water, which, in the meanwhile, has been accumulated in the tank 2. The unit then repeats the operation as previously described.

The opening of the valves may be effected either by hand or automatically. In this case, the opening may occur after the exchange of the filters and then lifting the press movable unit. It will be apparent that as the conduit 9a moves upwardly, it will act to unseat the valve 16, as shown in FIG. 2, the valve 16 having a hollow stem which telescopes into the conduit 9a for a limited distance, permitting a flow of fluid from the tank 2 through the conduit 9a and that the lifting of the pressing piston 7a will open the valve 8a permitting the further flow of fluid through the powder contained in the cup 14a and filtering wall 13a and grid 12a. The same action takes place in the lower units with the opening of the valves 11a and 11b substituting for the valve 16.

It is apparent that the assembly may serve for more rapid operation than in presently known apparatus.

It is intended that the drawing only illustrates an embodiment, given only as a practical demonstration of the invention, said invention being in conditions as to be varied in the forms and arrangements without however departing from the scope of the concept which forms said invention. For instance, more stations or a smaller number of stations may be provided with respect to those herein illustrated.

What I claim is:

1. Apparatus for the preparation of concentrated coffee solutions or the like comprising a multiple vertical press having a plurality of vertically aligned hoppers, a filter cup mounted in each of the hoppers, a pressing piston vertically slidably mounted in each of said cups, said pressing pistons being simultaneously movable, valve means interconnecting each hopper with its underlying cup, and a discharge pipe at the lower end of the lowermost hopper.

2. Apparatus as defined in claim 1 wherein a loading tank is mounted above the uppermost cup and a valved connection is provided between said uppermost cup and said tank.

3. Apparatus as defined in claim 2 wherein a heating jacket is provided on each of said hoppers.

4. Apparatus as defined in claim 3 wherein said filter cups are identical in size and shape and interchangeably receivable in each of said hoppers.

References Cited in the file of this patent

UNITED STATES PATENTS 1,551,855　　Svendsgaard _____ Sept. 1, 1925

FOREIGN PATENTS 451,476　　Great Britain _____ Aug. 6, 1936